US010625387B1

(12) United States Patent
McCormick (10) Patent No.: US 10,625,387 B1
(45) Date of Patent: Apr. 21, 2020

(54) SAFETY GUARD WITH ADJUSTABLE BELLOWS

(71) Applicant: Gemini Group, Inc., Bad Axe, MI (US)

(72) Inventor: Tim McCormick, Kinde, MI (US)

(73) Assignee: Gemini Group, Inc., Bad Axe, MI (US)

(*) Notice: Subject to any disclaimer, the term of this patent is extended or adjusted under 35 U.S.C. 154(b) by 0 days.

(21) Appl. No.: 16/291,103

(22) Filed: Mar. 4, 2019

(51) Int. Cl.
*B23Q 11/08* (2006.01)
*F16J 3/04* (2006.01)

(52) U.S. Cl.
CPC .......... *B23Q 11/0816* (2013.01); *F16J 3/041* (2013.01)

(58) Field of Classification Search
CPC ......... B23Q 11/0816; F16J 3/041; F16J 3/042
See application file for complete search history.

(56) References Cited

U.S. PATENT DOCUMENTS

| 3,824,890 A | * | 7/1974 | Zettler | ............... | B23Q 11/0816 409/134 |
| 6,296,413 B1 | * | 10/2001 | McCann | ............ | B23Q 11/0816 384/15 |

FOREIGN PATENT DOCUMENTS

| GB | 2072294 A | * | 9/1981 | ......... | B23Q 11/0816 |
| WO | WO-2016013231 A1 | * | 1/2016 | ......... | B23Q 11/0816 |

* cited by examiner

*Primary Examiner* — Vicky A Johnson
(74) *Attorney, Agent, or Firm* — Fishman Stewart PLLC (57) ABSTRACT

An adjustable safety guard includes first, second and third portions which are operable to extend from a collapsed position where it can be easily stored, to an expanded position to where it operates as a functioning guard to protect a machine operator. One of the sections of the guard is expandable between an infinite number of positions which provides a flexible system that can be used in many different manufacturing applications.

20 Claims, 8 Drawing Sheets

SAFETY GUARD WITH ADJUSTABLE BELLOWS

FIELD OF TECHNOLOGY

The present disclosure pertains to a safety guard that may be deployed with machinery, and in particular, to a safety guard with an adjustable bellows feature.

BACKGROUND

Safety guards have been used to protect machine operators in an assorted array of applications in factories. Some applications include providing guards around the perimeter of stationary machinery such as stamping presses. The guard provides a safe distance for the machine operator to distance himself from the inner workings of the press. Some factory applications include providing guards around or along assembly lines that traverse parts and materials from point A to point B. In each such application the guard may be a fixed structure that can be permanently secured to mounting hardware that forms a part of the housing for the machinery or the structure for the assembly line. These style of safety guards are permanent in nature and are not accommodating to changing conditions in a factory.

An assembly line may need to be changed or reconfigured between operating shifts so as to accommodate part change over to meet the demands of production requirements. During the shift changes, a machine, assembly line, or the like, may need to be reconfigured to accommodate different parts, different machines, different assembly steps and processes, etc. In such circumstances, safety guards may need to be reconfigured, removed, extended, shortened, etc., so as to accommodate the newly reconfigured assembly process. Over a given day, this process could be repeated based on production demands.

OSHA has requirements that must be considered in order to maintain the safety of a work space. One such requirement may include reducing pinch zones in the area where a manufactured part exits a machine and is then relayed further downstream of the manufacturing process. For example, guards may be desired in the space downstream of the outlet of the stamping press and at the point where the conveyor removes the part from the machine downstream to where the part may be further processed, finished, assembled, etc. Permanent guards may be welded to the machine and/or assembly line in order to provide a safe operating condition.

The problem with permanent safety guards is that they do not provide the flexibility to accommodate quick manufacturing process change overs that may take place during or between shifts. Also, permanent guards are fixed in length and may not accommodate an assembly line that perhaps needs to be shortened or lengthened or otherwise modified to meet production demands. Also, some safety guards are large, inflexible and bulky in configuration. When these types of guards are removed from the production line, they often require significant storage areas. Space in a factory setting is often at a premium so allocating extra space to house safety guards is not an efficient use of resources.

It would be helpful to provide a flexible safety guard that can be used to overcome the aforementioned problems, accommodate various factory settings, is adjustable in nature such that it can be quickly and easily reconfigured, and if it is not needed due to production demands, it can be collapsed and then easily stored in a minimal about of space in the plant.

BRIEF DESCRIPTION OF THE DRAWINGS

Referring now to the drawings, illustrative embodiments are shown in detail. Although the drawings represent some embodiments, the drawings are not necessarily to scale, and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

A safety guard for use with a variety of machines, assembly lines, or other systems where safety is of concern, may include a U-shaped first section made of a rigid material; a U-shaped second section, the second section includes a plurality of expandable segments; a U-shaped third section that includes a portion that may be releasably detached from a machine; and a removable safety shield. The sections may be extended from a first position to a second position in order to elongate or extend the guard assembly. The first, second and third sections may alternatively be collapsed to a stowed position which provides a more refined assembly that can be more easily stored.

Figure 1:
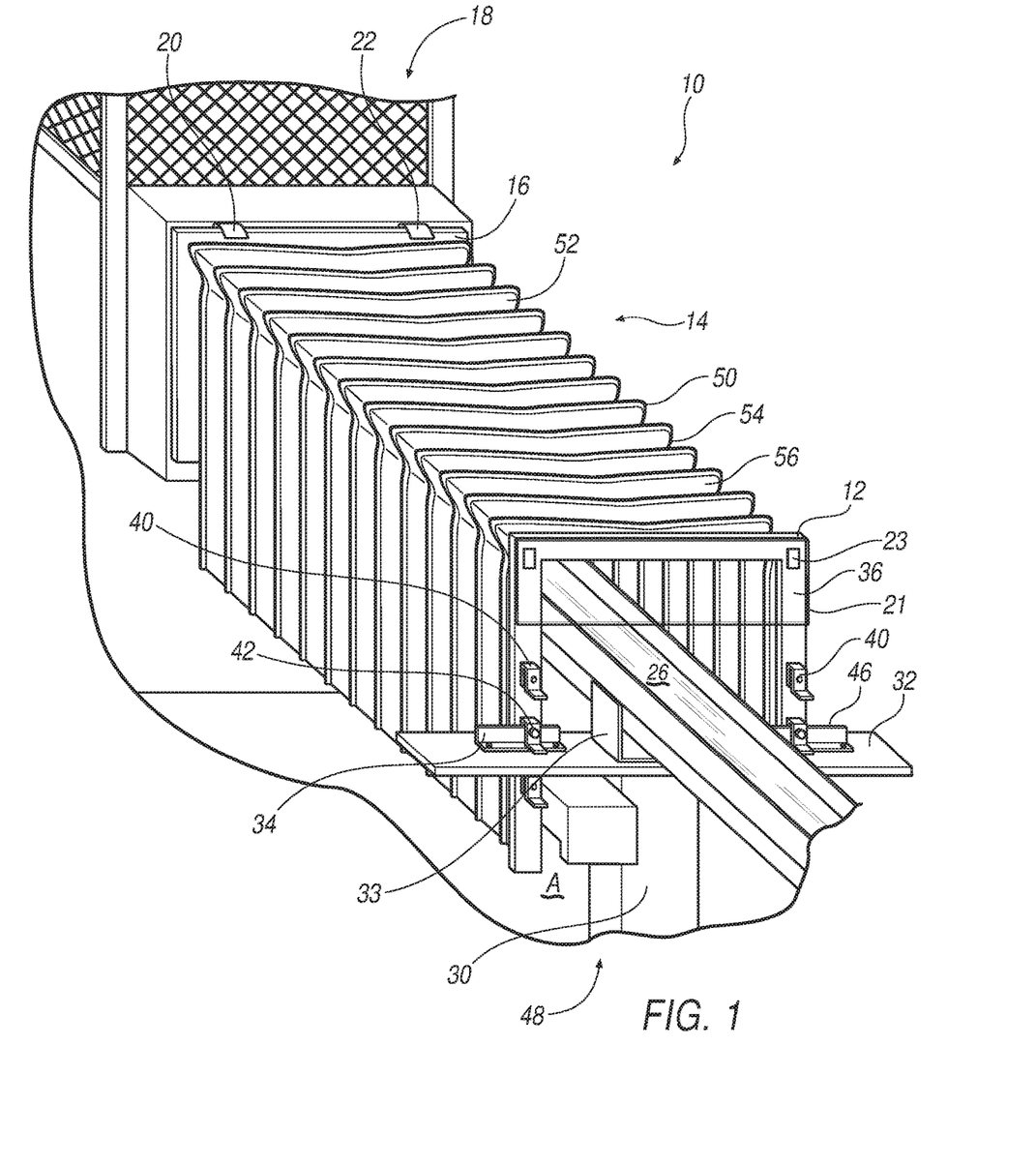
FIG. 1 is a perspective view of an embodiment of a safety guard assembly, shown in connection with a machine and an assembly line, where the guard's flexible bellows is extended.

Referring to the figures, FIG. 1 depicts an exemplary safety guard assembly 10. The safety guard assembly 10 includes first or front portion 12, an expandable bellows or middle portion 14, and a mounting or rear portion 16 that permits the assembly 10 to be connected to a machine 18. The assembly 10 may be used with a variety of machines 18, including but not limited to stamping presses, welding, molding, material removal, and/or other machines that fabricate and/or otherwise processes/move/index, parts, materials, etc. Thus, the assembly 10 is versatile and can be used in many applications.

Figure 8:
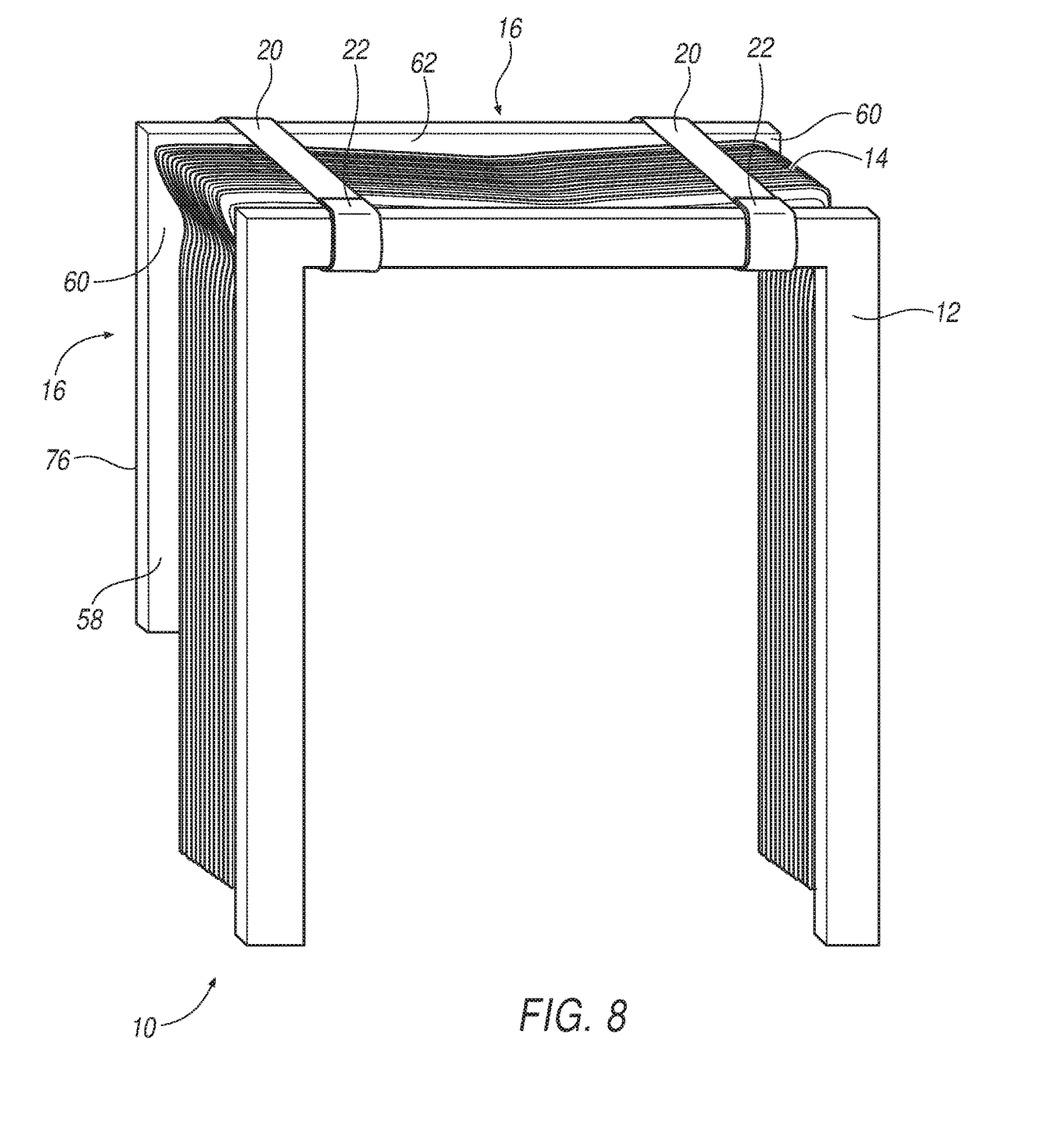
FIG. 8 is a perspective view of the bellows assembly removed from the machine and ready for storage.

The safety guard assembly 10 may further include a strap or securing member 20, or a plurality of said members 20 as is shown in FIG. 1, to provide a means to secure the three portions of the assembly 10 in a collective state as is shown in FIG. 8. The securing member 20 may be connected to the rear portion 16, temporarily or permanently, and may include a length that allows it to circumscribe the axial length of the guard assembly 10. The securing member 20 has a fastening portion 22 near an end that allows the ends of the securing member 20 to be releasably connected. It will be appreciated that the securing member 20 that is shown is of the hook and loop style, but that other systems may be deployed and are within the spirit of this disclosure.

Figure 3:
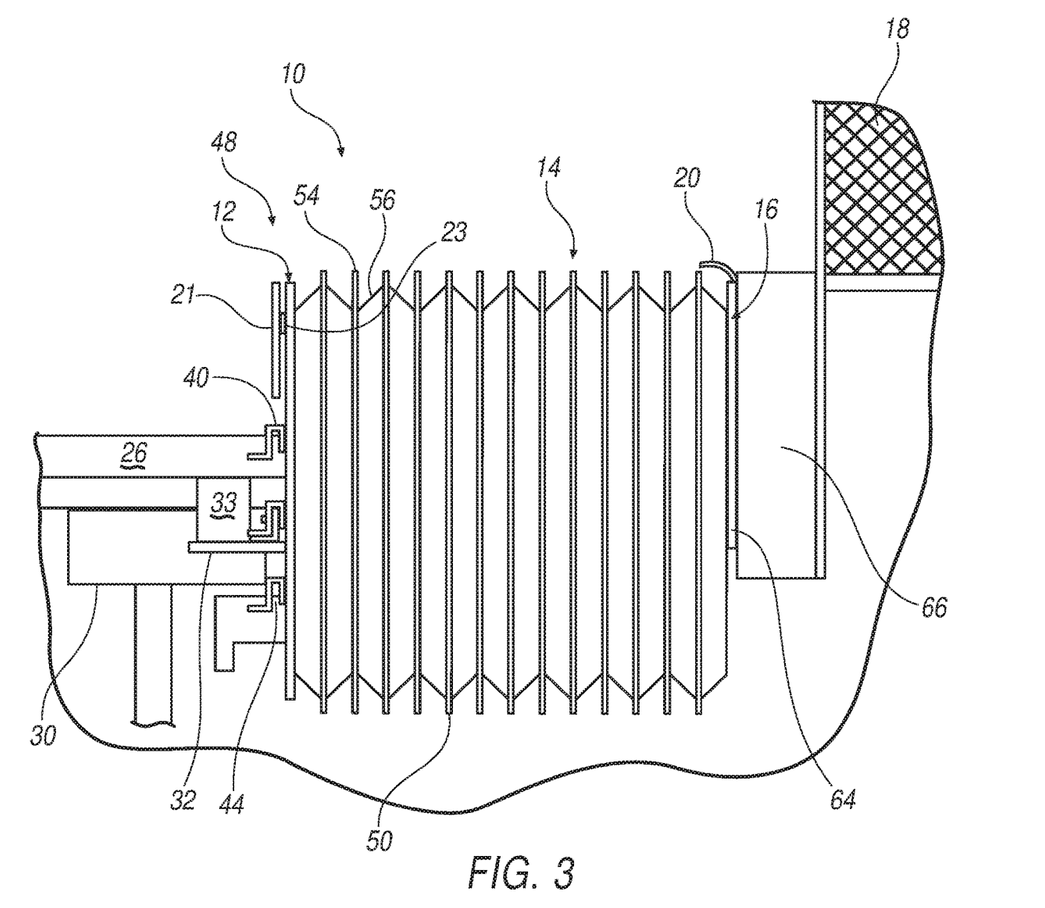
FIG. 3 is a side view of the FIG. 1 safety guard.

With reference to FIGS. 1 and 3, the safety guard assembly 10 may also include a removable barrier or shield 21 connected to the front portion 12 by a detachable device 23 such as a hook and loop system such as Velcro. The shield 21 may be made of clear material so that an operator may view into the assembly 10 in order to monitor parts being produced by the machine 18. The material type may be of Lexan, plexiglass, polycarbonate resin thermoplastic, acrylic, or other similar material that is rigid enough to form as a barrier to prevent hands from entering a work space that is created by the front, middle and rear portions. The shield 21 may be removable, adjustable, which is accomplished by the device 23 permitting detachment as is desired. By contrast, the shield 21 may be permanently attached to the front portion 12 using hardware or other attachment systems.

Figure 2:
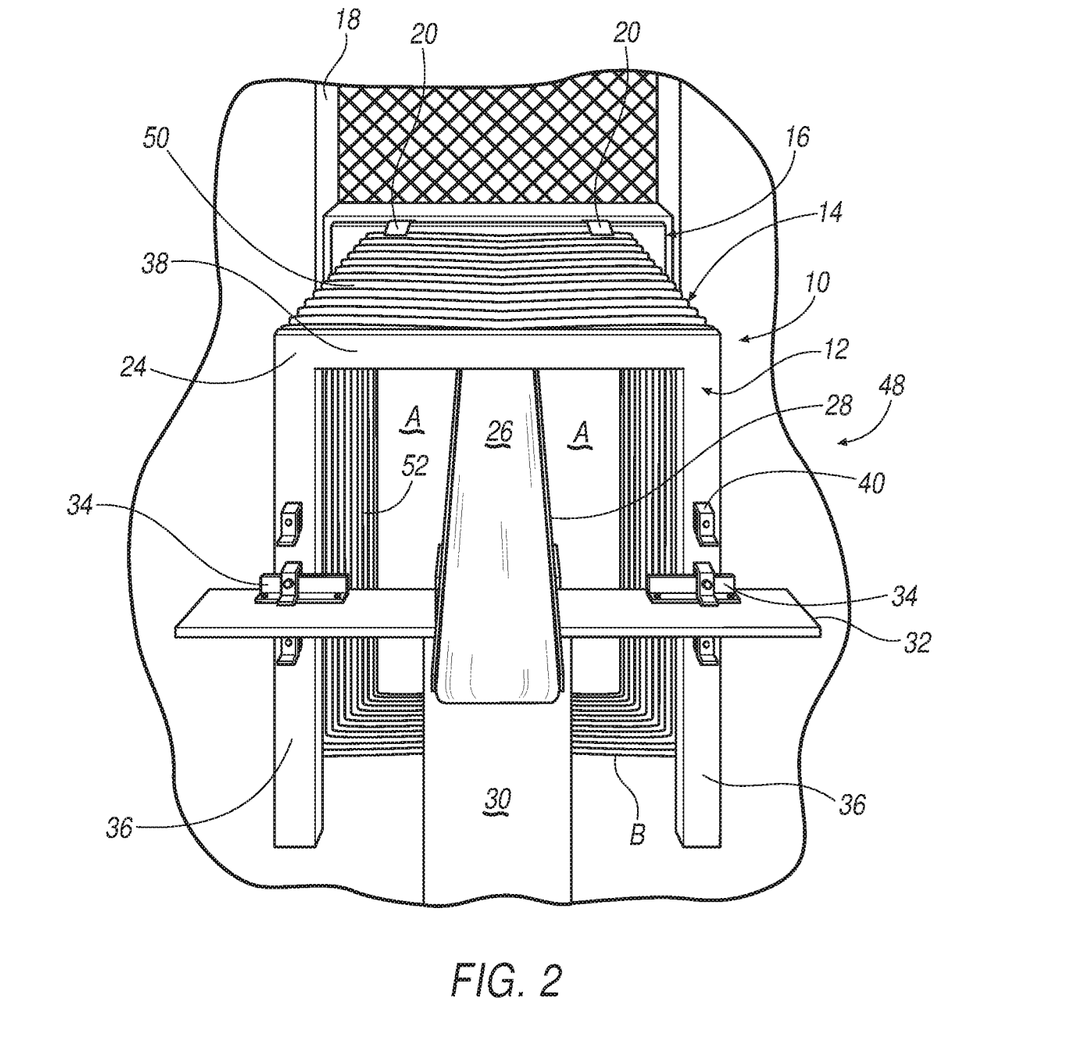
FIG. 2 is a front view of the FIG. 1 safety guard.

With continued reference to FIGS. 1-3, the front portion 12 of the guard assembly 10 is U-shaped 24 with the bottom area open for receiving a conveyor line 26 where parts and materials may traverse from the machine 18 to a space away from the machine 18. The conveyor line 26 may include a belt 28, a support base 30, a platform 32, a mounting bracket 33, and one or more mounting members 34. The mounting member 34 may be an L-shaped angle iron section that can be welded to the top surface of the platform 32 for providing a space for the front portion 12 to be mounted to. The front portion 12 includes two downward members 36 that are spaced apart and connected by a central section 38. The first portion 12 may be formed of a single piece as is shown, or it may be welded or otherwise fabricated to have the three members to make an assembly. The conveyor line 26 is supported by a mounting bracket 33 which in turn may be mounted to the platform 32. The platform 32 is secured to the base 30 which supports the conveyor line 26 and the parts thereon.

The front portion 12 includes a plurality of U-shaped clamps or mounting devices 40 and hardware 42 that are spaced apart from one another vertically on the downward members 36. The mounting devices 40 have an open portion 44 that faces downward with an opening size capable of receiving an upper lip 46 of the mounting bracket 33. The hardware 42 may be tightened inwardly to apply a force against the mounting bracket 33 and the upper lip 46 so as to secure them relative to one another. The one end 48 of the safety guard assembly 10 may be adjusted vertically by positioning the mounting member 34 in the upper, middle or lower mounting devices 40. Thus, the assembly 10 is adjustable both along the vertical axis, as well as the longitudinal axis.

The middle portion 14 of the assembly includes a plurality of flexible expandable segments or members 50 that are arranged collectively to work in concert like an accordion or bellows 52. They operate to expand collectively inward and/or outward depending on the desired position for the current manufacturing environment. More or fewer segments 50 may be arranged based on the desired length of the assembly 10. The bellows 52 is continuous in nature where each segment 50 may have a pair of seams that are sewn together to form a rigid skeleton 54. A flexible polymer like member 56 is interposed between each skeleton 54 that collectively forms a continuous flexible barrier so that hands or other items may not enter the area A near the conveyor 26. The bellows 52 has flexibility, is adjustable longitudinally to fit the manufacturing environment, has memory and can easily spring back to its original shape and/or to a collapsed condition as is shown in FIG. 8. FIG. 2 shows the bellows 52 closing off the area A such that the bottom B is closed off to keep people from entering the area A from the bottom. Alternatively, as is shown in FIG. 1, the area A may be open at the bottom so as to permit entry into area A from the bottom. The skeleton 54 may be U-shaped, square, oval, circular, or other geometric configuration. The skeleton 54 is rigid in nature to provide a structure for the flexible members 56 to have support. The members 56 may be molded, affixed, or otherwise connected to the skeleton 54. The bellows 52 is continuous in nature and are connected on one end to the front portion 12 and at the other end to the rear portion 16. Collectively the front, middle and rear portions form an adjustable feature that is universal and operable for use with various manufacturing settings.

Figure 6:
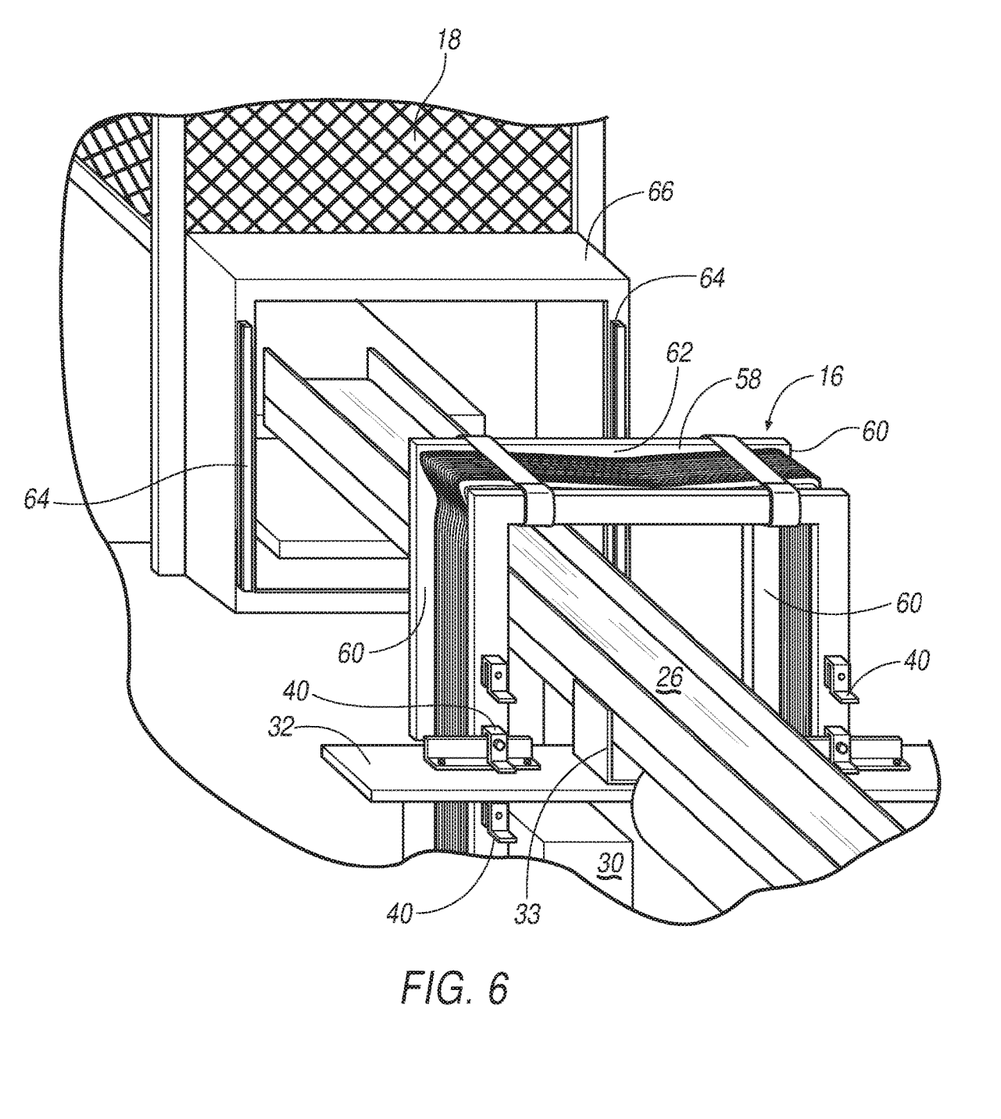
FIG. 6 is perspective view of the FIG. 1 safety guard assembly, showing the bellows assembly disconnected from the machine.

With reference to FIGS. 3, 6 and 8, the rear portion 16 includes a U-shaped member 58 having a pair of downwardly extending members 60 and a middle section 62. It may be formed of a single unitary piece or comprised of multiple fabricated parts to collectively form the rigid U-shape member. The downwardly shaped extending members 60 have a thin cross-sectional profile and they are operable to slide within a channel 64 that is part of a safety shoot 66 of the machine 18. Thus, the rear portion 16 can be slidably and removably fixed to a machine 18 which in turn holds the one end of the guard assembly 10 firmly in place during operation. The front end of the assembly 10 can be secured to the base 30 at the predetermined height as discussed above. To remove the rear portion of the assembly 10 from the machine 18, the operator slides the rear portion 16 upward to disconnect the rear portion 16 from the channel 64. To remove the front portion 12 of the guard assembly 10 from the base 30, the operator loosens the hardware 42 and lifts up to separate the front portion 12 from the platform 32. To install the guard assembly 10 to a machine 10, the inverse steps may be deployed.

Figure 4:
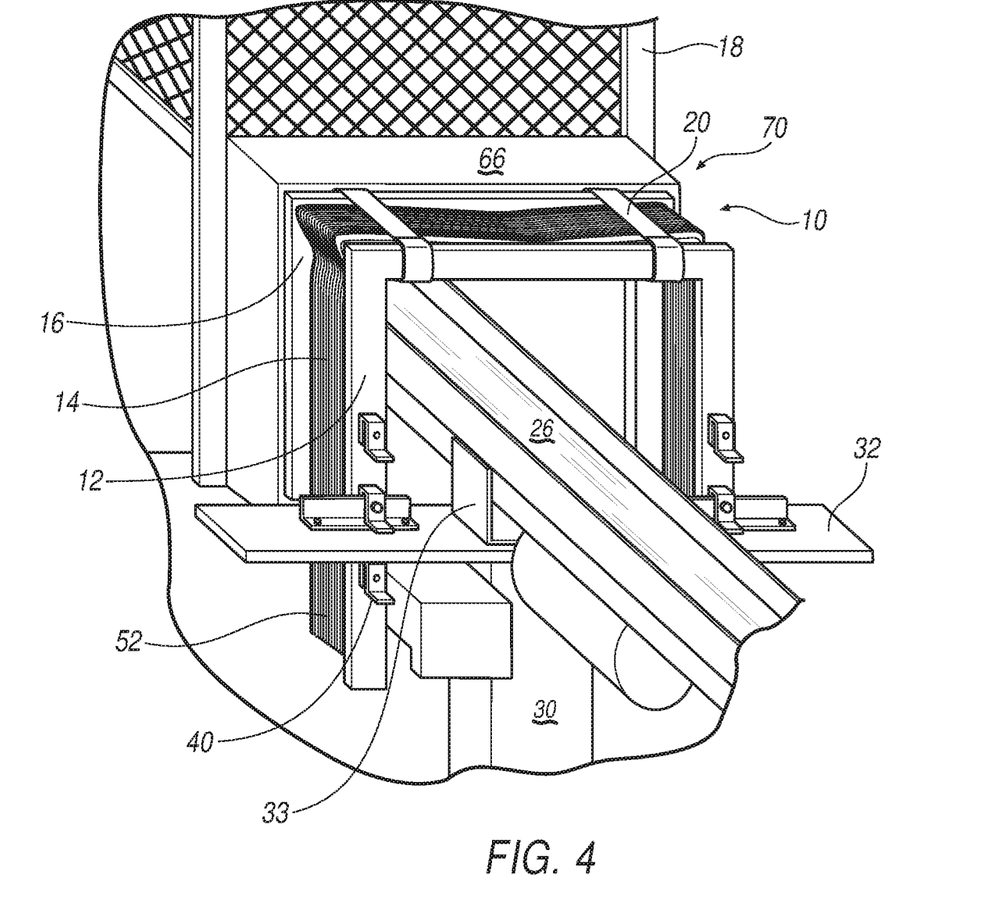
FIG. 4 is a perspective view of the FIG. 1 safety guard assembly, showing the flexible bellows in a collapsed condition.

FIG. 4 depicts the guard assembly 10 in a retracted or closed 70 position while still attached to the machine 18. Here the securing members 20 are shown wrapped around the first, second and third portions and firmly holding them together. This is also known as a stowed position and can be used when the machine 10 is not in use. The bellows 52 is shown collapsed and in this scenario, the assembly 10 is much smaller in configuration than when deployed thus reducing the size of the assembly 10 when on the plant floor. It will be appreciated that the guard assembly 10 may be stored while in this position so as to conserve space on a plant floor. In this configuration the machine 18 would not be operating. When the production line is ready to be restarted, a machine operator may extend the guard assembly 10 which causes the bellows 52 to expand longitudinally to a desired position where the front portion 12 can be re-mounted to the platform 32.

Figure 5:
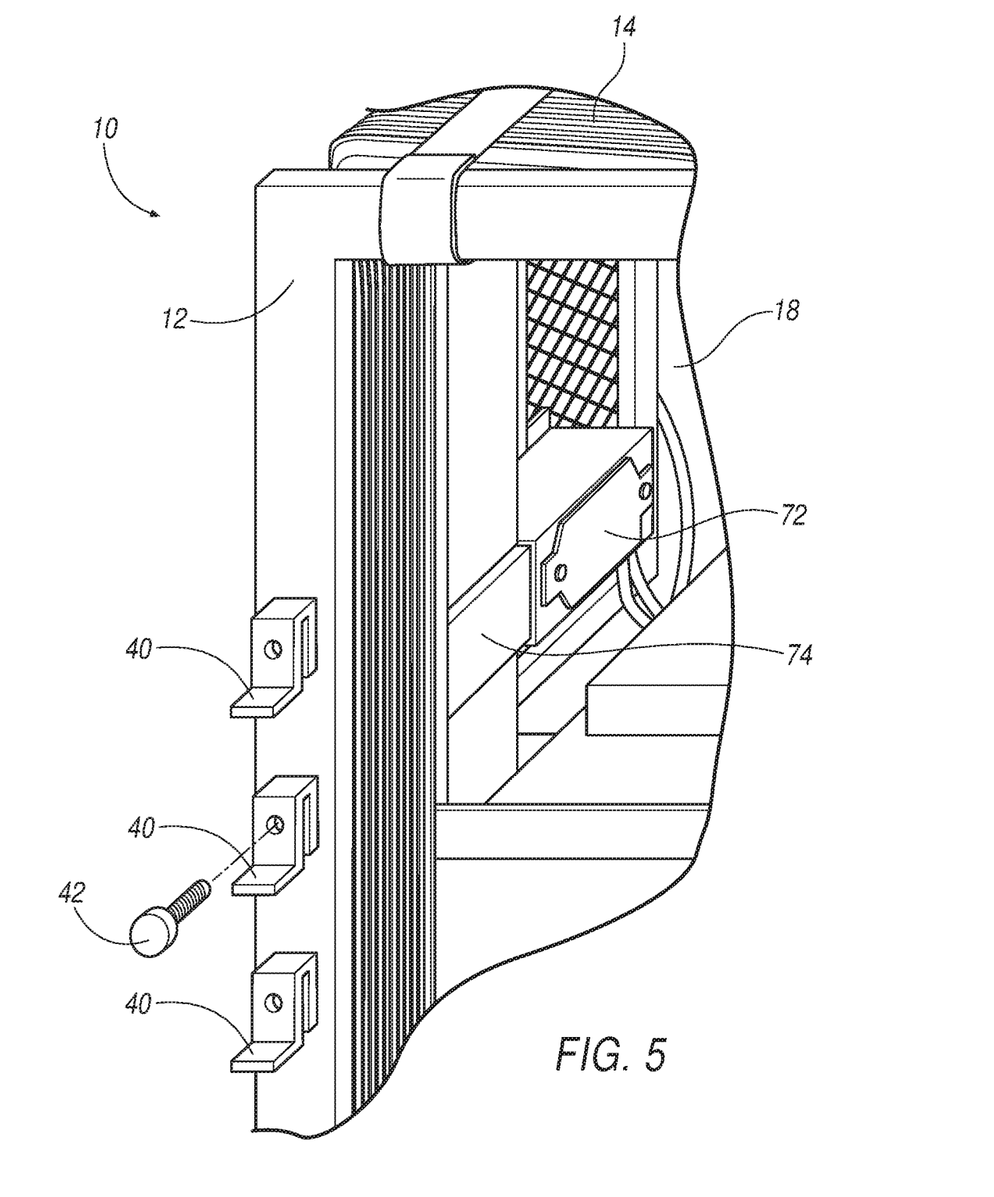
FIG. 5 is perspective view of the FIG. 1 safety guard assembly, showing the front mounting feature.

FIG. 5 illustrates a partial close up perspective view of the guard assembly 10 when in the collapsed position, while still mounted to the machine 18. Hardware 42 may be used to thread into the mounting devices 40 for firmly connecting the front portion 12 of the assembly to the platform 32. The assembly 10 is shown here relative to the machine 18 and a sensor 72 can be mounted to an inside wall of the machine. The sensor 72 works in concert with a trip or switch 74 that is operable to engage the rear portion 16 of the assembly 10. It will be appreciated that the sensor 72 and switch 74 may be one or separate units. The switch 74 may have detents 76 that are operable to engage a back surface of the downward shaped members 60 of the rear portion 16 so as to complete a circuit when the assembly 10 has been installed relative to the machine 18. Once this circuit is complete, the machine 18 receives a go signal which may inform an operator that the safety guard 10 is in place.

FIG. 6 illustrates the guard assembly 10 shown removed from the machine 18 and the assembly 10 has been collapsed and bound so that it can be stowed and stored in to another location. FIG. 8 illustrates the assembly 10 completely removed from the machining environment and ready for simple storage. In this configuration the assembly 10 may be hung on a wall or other location in the plant that is out of the way. Such will free up space on the plant floor thus allowing it to be re-purposed for another manufacturing event.

Figure 7:
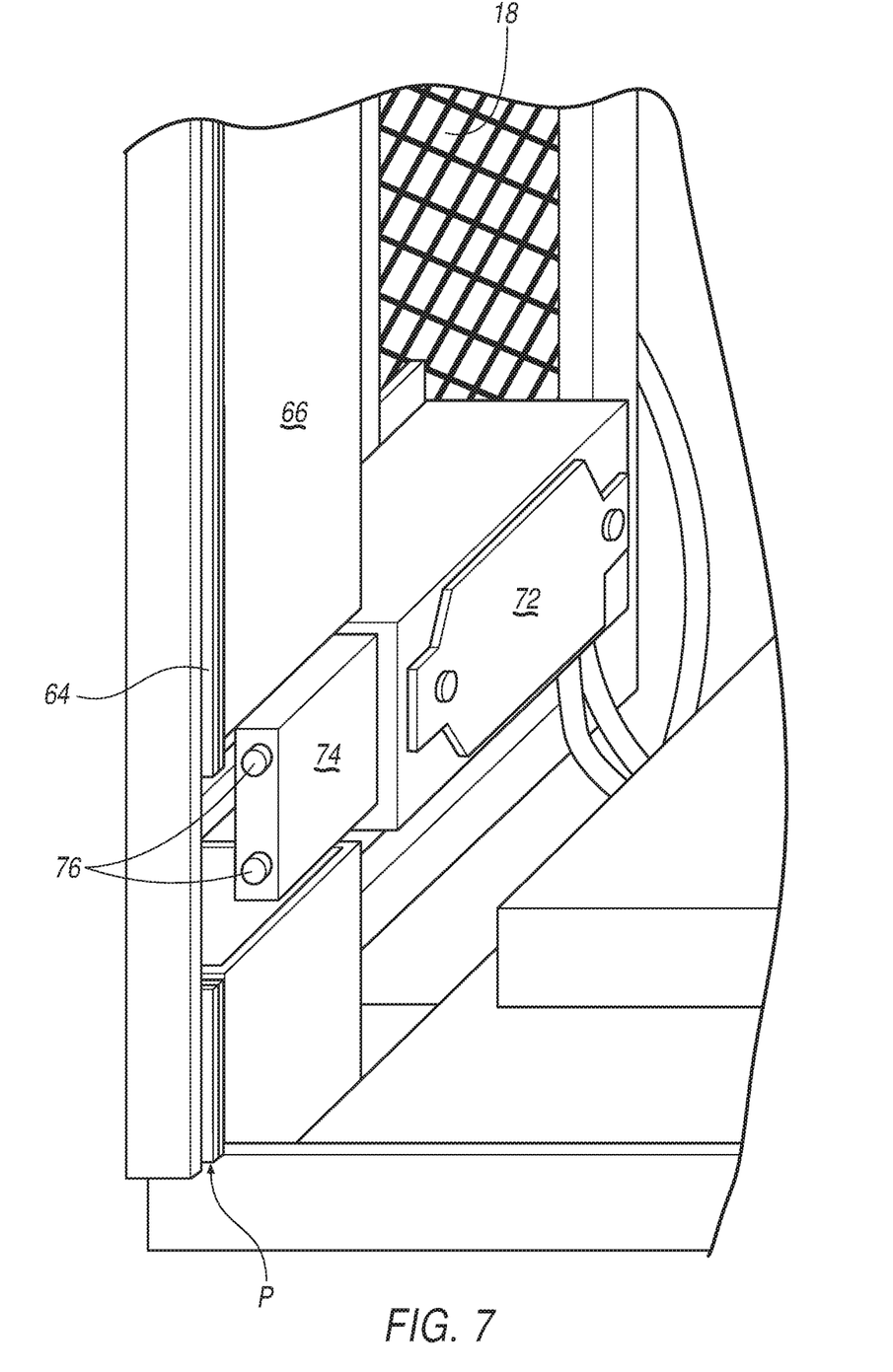
FIG. 7 is an enlarged perspective view of a switch on a machine that works in conjunction with the safety guard assembly.

FIG. 7 illustrates an enlarged perspective view of the sensor 72 and switch 72 located relative to the machine 18, but with the guard assembly 10 removed and out of the way. The detents 76 are operable to extend axially into a path P within the channel 64. The channel 64 may be formed as part of the shoot 66 or a separate component of a machine 18. When the detents 76 are extended, as is shown, the switch communicates with the sensor 72 to send a no-go signal thus informing the machine 18 that the guard assembly 10 is not installed or otherwise not in position. In such a scenario an operator may be informed to not operate the machine. Once the guard assembly 10 is reinstalled, as is shown in FIG. 4, the detents 76 are depressed which causes the sensor 72 to send a signal to the machine 18 that the guard has been installed.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A safety guard assembly comprising:
   a front section made of a rigid material, the front section including first, second and third portions, the first portion including a plurality of outwardly extending mounting members that are vertically offset from one another, the second portion is disposed between the first and third portions, and the third portion includes a plurality of outwardly extending mounting members that are vertically offset from one another to permit vertical adjustment of the front section;
   a middle section is connectible to the front section, the middle section includes a plurality of expandable segments; and
   a rear section made of rigid material, the rear section including a first, second and third portions, the first portion being connectible to a machine, the second portion is disposed between the first and third portions, and the third portion is connectable to a machine,
   whereby the middle section may be adjusted from a first position to a second position.

2. The assembly of claim 1, further comprising a shield that may be removably connected to one of the first, second or third portions.

3. The assembly of claim 1, further comprising a support base and a platform, the front section is connectable to the platform.

4. The assembly of claim 1, further comprising a closure member that is operable to hold the front, middle and rear sections together.

5. The assembly of claim 1, further comprising hardware that is operable to connect a mounting member on the front section to a support member.

6. The assembly of claim 1, wherein the front, middle and rear sections are U-shaped.

7. The assembly of claim 1, wherein one of the mounting members is is U-shaped and is connectable to a support member.

8. The assembly of claim 1, further comprising a conveyor.

9. The assembly of claim 1, further comprising a conveyor and a safety cage for a machine.

10. The assembly of claim 1, further comprising a sensor, the sensor is operable to engage one of the front, rear or middle sections of the safety guard.

11. The assembly of claim 1, further comprising a sensor that is operable to determine when a portion of the safety guard assembly is installed.

12. The assembly of claim 1, wherein the middle section has a bellows configuration.

13. The assembly of claim 1, wherein each expandable segment includes a skeleton portion and flexible material adjacent to the skeleton portion, the flexible material is compressible.

14. The assembly of claim 1, wherein the middle section can be extended to a first position, or be collapsed to a second position.

15. The assembly of claim 1, wherein the first portion can be adjusted to accommodate different heights at one or more levels.

16. The assembly of claim 1, further comprising a longitudinal recess for receiving the rear section, the rear section is securable relative to a machine.

17. A safety guard for use with a machine, the guard comprising:
   a U-shaped first section made of a rigid material,
   a U-shaped second section, the second section includes a plurality of expandable segments;
   a U-shaped third section that includes a portion that may be releasably detached from a machine; and a retention member to secure the second section while in a collapsed state;
   wherein at least one of said sections may be extended from a first position to a second position so as to elongate the guard, wherein the first, second and third sections may be collapsed to a stowed position.

18. The guard as claimed in claim 17, further comprising at least one mounting member associated with one of said sections, the mounting member is disposed on a surface of said section and is operable to engage a support.

19. The guard as claimed in claim 17, wherein the retention member is a strap.

20. An adjustable safety guard comprising:
   a U-shaped member made of a rigid material,
   a U-shaped member including an expandable accordion portion;
   a U-shaped member including a portion that may be releasably detached from a machine; and
   a sensor that is operable to engage one of the U-shaped members in order to determine when a safety guard is installed to a machine,
   wherein at least one of said members may be extended from a first position to a second position to elongate the guard,
   wherein the members may be collapsed to a stowed position.

* * * * *

UNITED STATES PATENT AND TRADEMARK OFFICE
CERTIFICATE OF CORRECTION

PATENT NO. : 10,625,387 B1
APPLICATION NO. : 16/291103
DATED : April 21, 2020
INVENTOR(S) : Tim McCormick

Page 1 of 1

It is certified that error appears in the above-identified patent and that said Letters Patent is hereby corrected as shown below:

In the Claims

Column 6, Claim 7, Line 29, delete second "is"

Signed and Sealed this
Twentieth Day of October, 2020

Andrei Iancu
*Director of the United States Patent and Trademark Office*